US009693440B1

(12) United States Patent
Ershov

(10) Patent No.: US 9,693,440 B1
(45) Date of Patent: Jun. 27, 2017

(54) EUV LPP SOURCE WITH IMPROVED DOSE CONTROL BY TRACKING DOSE OVER SPECIFIED WINDOW

(71) Applicant: ASML Netherlands B.V., Veldhoven (NL)

(72) Inventor: Alexander Igorevich Ershov, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/975,436

(22) Filed: Dec. 18, 2015

(51) Int. Cl.
*G01N 23/00* (2006.01)
*H05G 2/00* (2006.01)

(52) U.S. Cl.
CPC ............. *H05G 2/008* (2013.01); *H05G 2/003* (2013.01)

(58) Field of Classification Search
CPC ............................... H05G 2/008; H05G 2/003
See application file for complete search history.

(56) References Cited

U.S. PATENT DOCUMENTS

2011/0220816 A1* 9/2011 Kakizaki ................ H05G 2/003 250/504 R
2014/0191132 A1* 7/2014 Schafgans .............. H05G 2/003 250/372
2014/0264089 A1* 9/2014 Kim ....................... H05G 2/008 250/504 R

* cited by examiner

*Primary Examiner* — David J Makiya
*Assistant Examiner* — Kenneth J Malkowski
(74) *Attorney, Agent, or Firm* — Gard & Kaslow LLP

(57) ABSTRACT

A method and apparatus for controlling a dose of extreme ultraviolet (EUV) radiation generated by a laser produced plasma (LPP) EUV light source. In one embodiment, a running total of the EUV energy generated over a predetermined number of laser pulses is measured; once that number of pulses is exceeded, the energy from the pulse immediately preceding the most recent predetermined number of pulses is dropped from the running total, so that the running total is from the most recent predetermined number of pulses. If the running total of the EUV energy exceeds a target dose, the next pulse is caused to not hit a droplet. This avoids the unwanted side effects of various prior art solutions, such as needing to miss many droplets in a row, or requiring the laser pulses to be shortened or reduced in power as in other prior art solutions.

9 Claims, 4 Drawing Sheets

EUV LPP SOURCE WITH IMPROVED DOSE CONTROL BY TRACKING DOSE OVER SPECIFIED WINDOW

FIELD OF THE INVENTION

The present invention relates generally to laser produced plasma (LPP) extreme ultraviolet (EUV) light sources. More specifically, the invention relates to a method and apparatus for improving the control of a dose of EUV radiation generated by an LPP EUV light source to be applied to an item, such as a semiconductor wafer, being processed.

BACKGROUND OF THE INVENTION

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between about 5 and 120 nm. EUV lithography is currently generally considered to include EUV light at wavelengths in the range of about 10-14 nm, and is used to produce extremely small features, for example, sub-32 nm features, in substrates such as silicon wafers. These systems must be highly reliable and provide cost effective throughput and reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or cluster of material having the desired line-emitting element, with a laser pulse at an irradiation site. The target material may contain the spectral line-emitting element in a pure form or alloy form, for example, an alloy that is a liquid at desired temperatures, or may be mixed or dispersed with another material such as a liquid.

In one common embodiment, a droplet generator heats the target material and extrudes the heated target material as a series of droplets that travel along a trajectory to the irradiation site to intersect a corresponding series of laser pulses. Ideally, the irradiation site is at one focal point of a reflective collector. When a laser pulse hits a droplet at the irradiation site, the droplet is vaporized and the reflective collector causes the resulting EUV light output to be maximized at another focal point of the collector. When subsequent droplets are hit with subsequent laser pulses, further EUV light output is provided.

LPP EUV systems are typically "MOPA" systems, in which a master oscillator and power amplifier form a source laser which may be fired as and when desired, and "MOPA PP" ("MOPA with pre-pulse") systems in which a droplet is sequentially illuminated by more than one light pulse. In a MOPA PP system, a "pre-pulse" is first used to heat, vaporize or ionize the droplet and generate a weak plasma, followed by a "main pulse" which converts most or all of the droplet material into a strong plasma to produce EUV light emission.

One issue is that it is desirable, and in fact important, to be able to control the amount, or "dose," of EUV light energy being applied to a particular item being treated, such as a semiconductor wafer. For example, a specified amount of EUV light energy may be required to accomplish some task, such as curing a layer of photoresist, on a semiconductor wafer as part of the manufacturing process. In order to obtain consistent results across different wafers, it will be desirable to apply the same amount of EUV light energy to each wafer, to as great a degree of accuracy as possible.

This is complicated by the fact that the power in each laser pulse may vary. Since the amount of EUV energy released when a laser pulse hits a droplet varies with the power in the laser pulse, the EUV light energy generated by any given droplet may also vary.

At present there are two ways that such dose control is accomplished in an EUV source. One is known as packet-based dose control, and the other is called EUV stabilization.

In packet-based dose control, the laser pulses, and thus the corresponding droplets, are divided into "packets" or groups of pulses (and droplets), and a desired dose target selected that each packet should meet. A packet may typically include 50 pulses, but packets of as few as 15 pulses have also been used. A dose target is selected, which each packet is intended to meet.

The EUV energy that is generated by each pulse hitting a corresponding droplet is measured. For each packet, a total accumulated dose is then calculated by adding the energy from each droplet over the series of droplets, starting with the first droplet in the packet. Once the dose target for the packet is achieved, the rest of the pulses in that packet are "skipped" or "missed," i.e., droplets are not hit by the laser pulses. Skipping a droplet is typically accomplished either by firing the laser at a location other than the irradiation site at which the droplet is located, or by firing the laser at a time such that a droplet will not be at the irradiation site when the laser pulse arrives there.

The problem with packet-based dose control is that due to the variation in laser pulse energy, and thus in the EUV energy generated by each droplet, different packets may end up with very different numbers of pulses that actually generate energy. Since the pulses that do not generate EUV energy are all at the ends of the packets, there will be gaps between EUV pulse trains in sequential packets, and these gaps will also have a variable duration. In some cases, the target dose might be met by 10 droplets of a 15 droplet packet, with the remaining 5 droplets not hit, or 30 droplets of a 50 droplet packet, with the remaining 20 droplets not hit, resulting in gaps of 33% and 40% of the packet respectively.

The EUV energy also heats up the EUV plasma, and the variation in the EUV pulse trains will thus cause the temperature of the plasma to also vary from packet to packet. This variation in temperature can lead to a less stable plasma and in turn cause further variations in the EUV pulse energy. As a result, a larger "dose margin," the difference between the maximum power that the system can theoretically produce and the amount of power that is desired, is required in order to insure that the dose target will be consistently met. This reduces the dose controlled EUV power that can be achieved in the LLP EUV source.

The EUV stabilization approach to dose control attempts to avoid plasma instabilities by eliminating the gaps between the packets that occur in packet-based dose control. Instead of skipping droplets, the pulse energy of each laser pulse is controlled by adjusting either the duration of the pulse or the magnitude of the pulse from the master oscillator of the laser.

The problem with the EUV stabilization approach is that reduction of the master oscillator pulse energy leads to incomplete extraction of the gain in the power amplifier. As is well known in the art, this can lead to self-lasing and large amounts of reflected power from the droplets that can damage optical components in the system. Additionally, reducing the laser energy hitting the droplet can produce increased amount of debris due to incomplete evaporation of the target, which is not desirable in the source.

What is needed is an improved way to control a dose of EUV radiation generated by an LPP EUV light source that extracts all of the gain from the power amplifier without creating large gaps between EUV pulse trains.

SUMMARY OF THE INVENTION

Disclosed herein are a method and apparatus for improving the control of a dose of EUV radiation generated by an LPP EUV light source and applied to an item, such as a semiconductor wafer, being processed.

In one embodiment, a method is disclosed for controlling a dose of extreme ultraviolet (EUV) radiation generated by a laser produced plasma (LPP) EUV light source, the LPP EUV light source creating EUV energy by firing source laser pulses capable of hitting droplets of target material with a laser pulse, comprising: firing a pulse from the source laser to hit a droplet; measuring by a sensor the EUV energy created by the laser pulse hitting the droplet; adding, by a controller, the measured EUV energy to a running total of the EUV dose generated by laser pulses that have been fired; incrementing, by the controller, a count of laser pulses that have been fired; comparing, by the controller, the count of laser pulses to a predetermined number; if the count of laser pulses exceeds the predetermined number: subtracting, by the controller the EUV energy measured from a pulse immediately preceding the most recent predetermined number of pulses from the total of the EUV dose generated and decreasing the count of laser pulses by one; comparing, by the controller, the running total of the EUV dose generated to a preselected dose target; and if the running total of the EUV dose exceeds the dose target, causing, by the controller, the source laser to fire a next laser pulse to not hit a droplet.

Another embodiment discloses a system for controlling a dose of extreme ultraviolet (EUV) radiation generated by a laser produced plasma (LPP) extreme EUV light source, the LPP EUV light source creating EUV energy by firing source laser pulses capable of hitting droplets of target material with a laser pulse, comprising: a sensor configured to measure the EUV energy created by a laser pulse hitting a droplet; a controller configured to: cause the source laser to fire a pulse to hit a droplet; add the measured EUV energy to a running total of the EUV dose generated by laser pulses that have been fired; increment a count of laser pulses that have been fired; compare the count of laser pulses to a predetermined number; if the count of laser pulses exceeds the predetermined number, subtracting the EUV energy measured from a pulse immediately preceding the most recent predetermined number of pulses from the total of the EUV dose generated and decrease the count of laser pulses by one; compare the running total of the EUV dose generated to a preselected dose target; and if the running total of the EUV dose exceeds the dose target, cause the source laser to fire a next laser pulse to not hit a droplet.

Still another embodiment discloses a non-transitory computer readable storage medium having embodied thereon instructions for causing a computing device to execute a method for controlling a dose of extreme ultraviolet (EUV) radiation generated by a laser produced plasma (LPP) EUV light source, the LPP EUV light source creating EUV energy by firing source laser pulses capable of hitting droplets of target material with a laser pulse, the method comprising: firing a pulse from the source laser to hit a droplet; measuring by a sensor the EUV energy created by the laser pulse hitting the droplet; adding, by a controller, the measured EUV energy to a running total of the EUV dose generated by laser pulses that have been fired; incrementing, by the controller, a count of laser pulses that have been fired; comparing, by the controller, the count of laser pulses to a predetermined number; if the count of laser pulses exceeds the predetermined number: subtracting, by the controller the EUV energy measured from a pulse immediately preceding the most recent predetermined number of pulses from the total of the EUV dose generated and decreasing the count of laser pulses by one; comparing, by the controller, the running total of the EUV dose generated to a preselected dose target; and if the running total of the EUV dose exceeds the dose target, causing, by the controller, the source laser to fire a next laser pulse to not hit a droplet.

DETAILED DESCRIPTION OF THE INVENTION

The present application describes a method and apparatus for improving the control of a dose of EUV radiation generated by a laser produced plasma (LPP) extreme ultraviolet (EUV) light source and applied to an item, such as a semiconductor wafer, being processed.

In one embodiment, a running total of the EUV energy generated over a number of laser pulses is measured. Once a certain predetermined number of pulses is exceeded, the energy from the oldest pulse within a moving window of the predetermined number of pulses is dropped from the running total, so that thereafter the running total is from the most recent predetermined number of pulses. If the running total of the EUV energy exceeds a target dose, the next pulse is caused to not hit a droplet; since the energy from the oldest pulse is dropped, in most cases this will reduce the running total of EUV energy slightly and cause it to be below the target dose.

Keeping a running total of the EUV energy generated over a number of pulses is similar to what is done in packet-based dose control. However, in the methods described herein, that running total is kept over a constantly moving window of pulses, rather than starting over with each packet. Further, in packet-based dose control, once the target dose for a packet is reached, all of the remaining droplets in the packet are skipped, which can result in large gaps between EUV pulses; such large gaps are avoided by the present approach as explained further herein.

In addition, the described method and apparatus allows the source laser to be fired at full power, rather than adjusting either the duration of the pulse or the magnitude of the pulse from the master oscillator. This allows all of the gain to be extracted from the power amplifier, in contrast to the prior art EUV stabilization approach to dose control.

Figure 1:
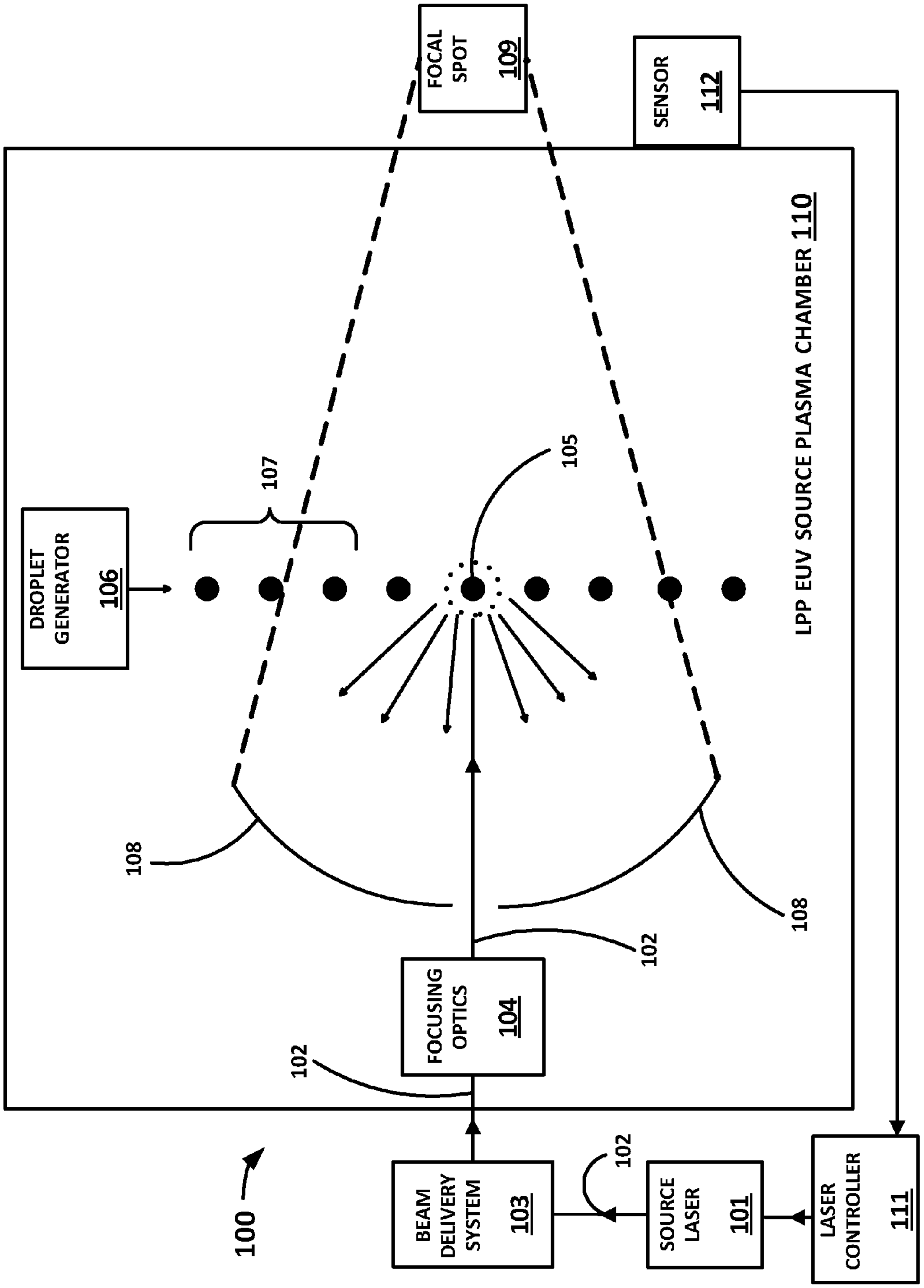
FIG. 1 is an illustration of some of the components of a typical embodiment of an LPP EUV system.

FIG. 1 illustrates a cross-section of some of the components of a typical LPP EUV system 100 as is known in the prior art. A source laser 101, such as a $CO_2$ laser, produces a laser beam (or a series of pulses) 102 that passes through a beam delivery system 103 and through focusing optics 104. Focusing optics 104 may, for example, be comprised of one or more lenses or mirrors, and has a nominal focal spot at an irradiation site 105 within a plasma chamber 110. In some embodiments, there may be multiple source lasers 101, with beams that all converge on focusing optics 104.

A droplet generator 106 produces droplets 107 of an appropriate target material that, when hit by laser beam 102, produces a plasma which emits EUV light. In some embodiments, droplets may be produced, and laser pulses fired, at a rate of 50,000 per second (50 kilohertz, or 50 kHz).

Irradiation site 105 is preferably located at a focal spot of collector 108, which has a reflective interior surface and focuses the EUV light from the plasma at EUV focus 109, a second focal spot of collector 108. For example, the shape of collector 108 may comprise a portion of an ellipsoid. EUV focus 109 will typically be within a scanner (not shown) containing pods of wafers that are to be exposed to the EUV light, after it was processed by the scanner optic (not shown).

A laser controller 111 controls the firing of the source laser 101. In various embodiments, the laser controller 111 determines how to fire source laser 101 based upon data from a sensor 112. For example, in the packet-based dose control of the prior art, sensor 112 measures the EUV energy generated by each pulse of source laser 101. If the target dose for a packet has been exceeded before all of the droplets in the packet have passed through irradiation site 105, laser controller 111 causes source laser 101 to fire at a direction other than irradiation site 105 in order to miss the remaining drops in the packet.

Alternatively, with changes to the logic or programming in laser controller 101, LPP EUV system 100 may also perform EUV stabilization dose control. If the delivered dose exceeds the target dose, laser controller 111 may cause laser source 101 to fire a shortened pulse or one of reduced power.

Many EUV sources of this type will also include a device for holding the object being treated, such as a semiconductor wafer; such a holding device is commonly called a scanner. Between the EUV source and the scanner is often located a screen or reticle with a small slit or aperture in it; the scanner and the reticle may move relative to one another. However, the goal is to expose each portion of the object being treated, for example, each die on the semiconductor wafer, to uniform light.

Based upon the width of the slit and the rate at which droplets are released (and pulses fired by the source laser), there is a number of pulses that will be fired in the time it takes for the treated object to move a distance of one slit width relative to the screen. In the current embodiments this number is defined as N_slit, and depends on such factors as resist sensitivity and EUV energy per droplet. N_slit may, for example, typically be in the range of 1000-5000 pulses, and is thus a much larger number than prior art values for the number of pulses in a packet.

In the described method and apparatus, rather than using packets of an arbitrary length as in packet-based dose control, the dose control relies on the value of N_slit for the particular object being treated and the particular task being performed on that object. While it is still expected that the total EUV energy delivered over N_slit droplets may still exceed the target dose, and thus that some droplets should be missed, it is desired that this occur in a reduced and more controlled way than in the packet-based dose control of the prior art.

Figure 2:
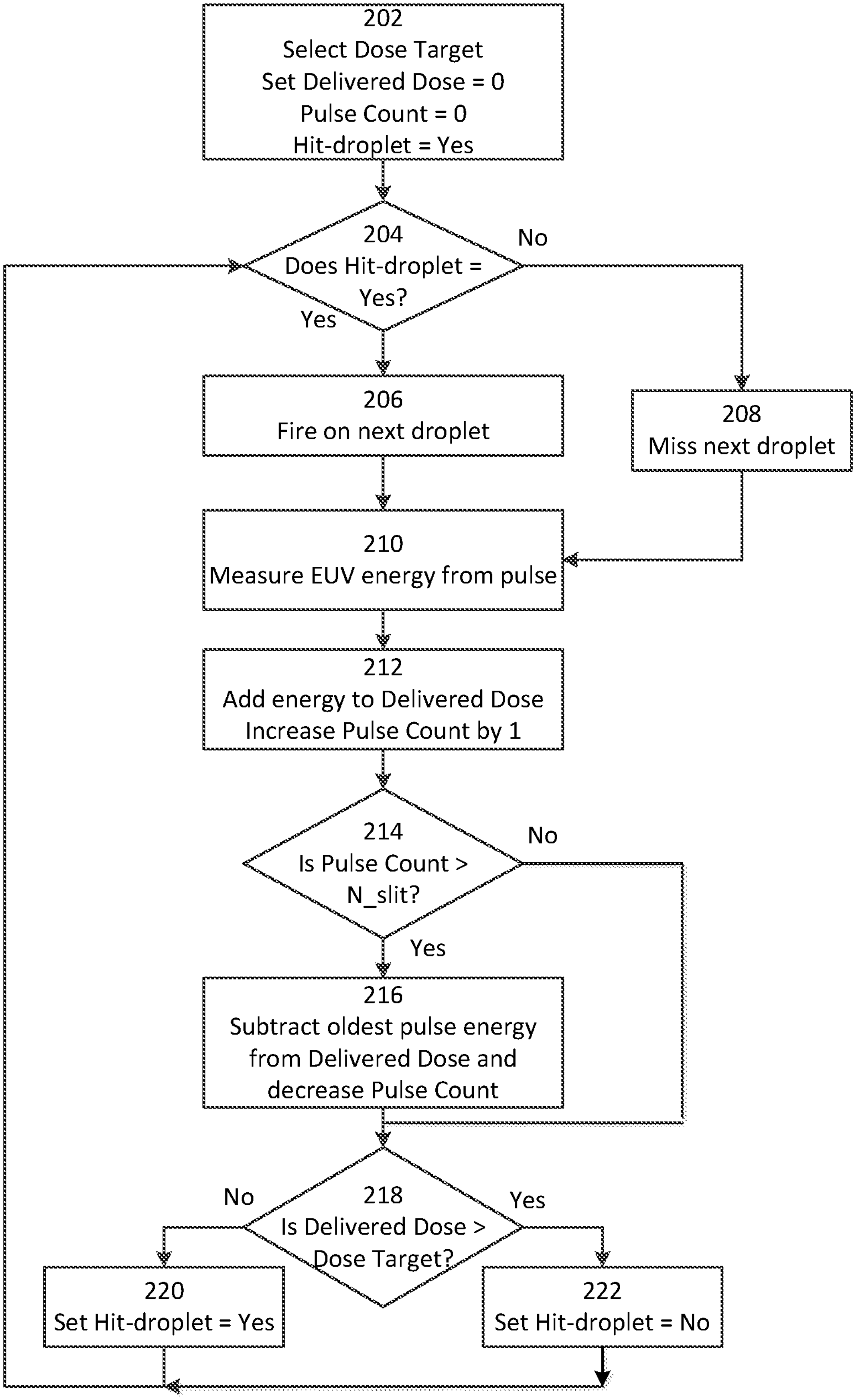
FIG. 2 is a flowchart of a method for improving the control of a dose of EUV radiation generated by an LPP EUV light source according to one embodiment.

FIG. 2 is a flowchart of a method that may be used for dose control in an LPP EUV system according to one embodiment.

At step 202, several values are set in a controller, for example, laser controller 111 of FIG. 1, for use in the method. The controller will typically contain, for example, a processor capable of running software or logic for storing program instructions, and a memory for storing various values as described herein.

First, a value is chosen for a desired amount of EUV energy that is to be delivered to the object being processed; this is here called Dose Target. Dose Target should be chosen in an amount that will have a desired effect on the object being processed; for example, Dose Target might be chosen in an amount that will result in a layer of photoresist applied to a semiconductor wafer being properly exposed. Dose Target may be selected or input by an operator of the system, or may alternatively be stored in a memory containing appropriate predetermined values for desired operations and retrieved by the controller.

Two more values are used to track the progress of the method. One value is the EUV energy that has been delivered to the object being processed, and is here called "Delivered Dose." Another value is the number of laser pulses that have contributed to Delivered Dose, and is here called Pulse Count. Both Delivered Dose and Pulse Count are initially set to zero.

Finally, as described below, a value is determined by, for example, laser controller 111 of FIG. 1, that indicates whether the laser source 101 should be fired so that a laser pulse hits the next droplet. Here that value is labeled "Hit-droplet," and when set to "Yes" indicates that the next droplet should be hit; when Hit-droplet is "No," then the next droplet should be missed. In step 202, Hit-droplet is initially set to Yes, so as to cause the laser source to fire to hit the first droplet.

At step 204, a controller or other logic device, such as laser controller 111 in FIG. 1, determines whether the value of Hit-droplet is Yes. If it is, the laser is caused to fire a laser pulse on the next droplet at step 206. If the value of Hit-droplet is not Yes, then the next droplet is missed at step 208.

At step 210, the EUV energy created by the droplet is measured, for example, by sensor 112 in FIG. 1. If the droplet was hit, there will be some positive value of EUV energy. If the droplet was missed, the value of the energy created will be zero.

At step 212, the controller adds the EUV energy created by the droplet measured at step 210 to the Delivered Dose, and increases the value of Pulse Count by 1.

At step 214 the controller determines whether the value of Pulse Count is greater than N_slit. Again, N_slit is the maximum number of pulses that will occur during the time that the object being processed passes the EUV source. It will be apparent that Pulse Count will only exceed N_slit after N_slit+1 pulses have occurred, because after the pulse before Pulse Count exceeds N_slit, Pulse Count will only equal N_slit and not exceed it.

At step 216, if Pulse Count is greater than N_slit, the controller subtracts the energy from the oldest pulse in a moving window of N_slit+1 pulses, i.e., the pulse N_slit+1 pulses previously, from Delivered Dose, so that Delivered Dose represents the energy from the prior N_slit pulses, and decreases Pulse Count by one, so that Pulse Count will again equal N_slit. It will be apparent that in this way only the energy from the most recent N_slit pulses will contribute to Delivered Dose.

Next, at step 218, is the controller determines whether Delivered Dose is greater than the value of Dose Target that was chosen in step 202 above. If Delivered Dose does not exceed Dose Target, then more EUV energy is desirable, and the controller sets the value of Hit-droplet to Yes at step 220 so that a laser pulse will hit the next droplet and provide more EUV energy. On the other hand, if Delivered Dose does exceed Dose Target, then the amount of EUV energy provided should be decreased, and the controller sets the value of Hit-droplet to No at step 222 so that the next droplet will be missed.

The method then returns to step 204, at which point the controller determines whether the next droplet should be hit by a laser pulse or not based upon the value of Hit-droplet. The process then repeats as long as the LPP EUV source is in operation.

It may be seen that in this way the method keeps track of the EUV energy that has been delivered to an object from the last N_slit pulses. If the EUV energy delivered is too great, a pulse misses the next droplet and any energy provided by the pulse fired at a time N_slit+1 pulses previously is removed from Delivered Dose. If that earlier pulse was one that provided energy, the value of Delivered Dose will decrease by the amount of energy provided by the earlier pulse. If Delivered Dose is not yet high enough, the next droplet will be hit and will increase the EUV energy provided.

In practice, since Delivered Dose occurs over 1000-5000 pulses as above, each pulse provides a smaller fraction of the total Delivered Dose than in the prior art, and Delivered Dose will increase slightly with each pulse that hits a droplet. Since the energy from each pulse will generally vary by no more than 10-20 percent, it is also unlikely that it will be necessary to miss more than one droplet to lower Delivered Dose to less than Dose Target, although in case of an extreme variation in pulse energy it is possible that two droplets in a row may need to be missed. As above, in the prior art packet-based dose control it is possible that as many as the last 5 droplets of a 15 droplet packet, or 20 droplets of a 50 droplet packet, would need to be missed. Thus, the present method significantly reduces the number of droplets in a row that may need to be missed.

Figure 3:
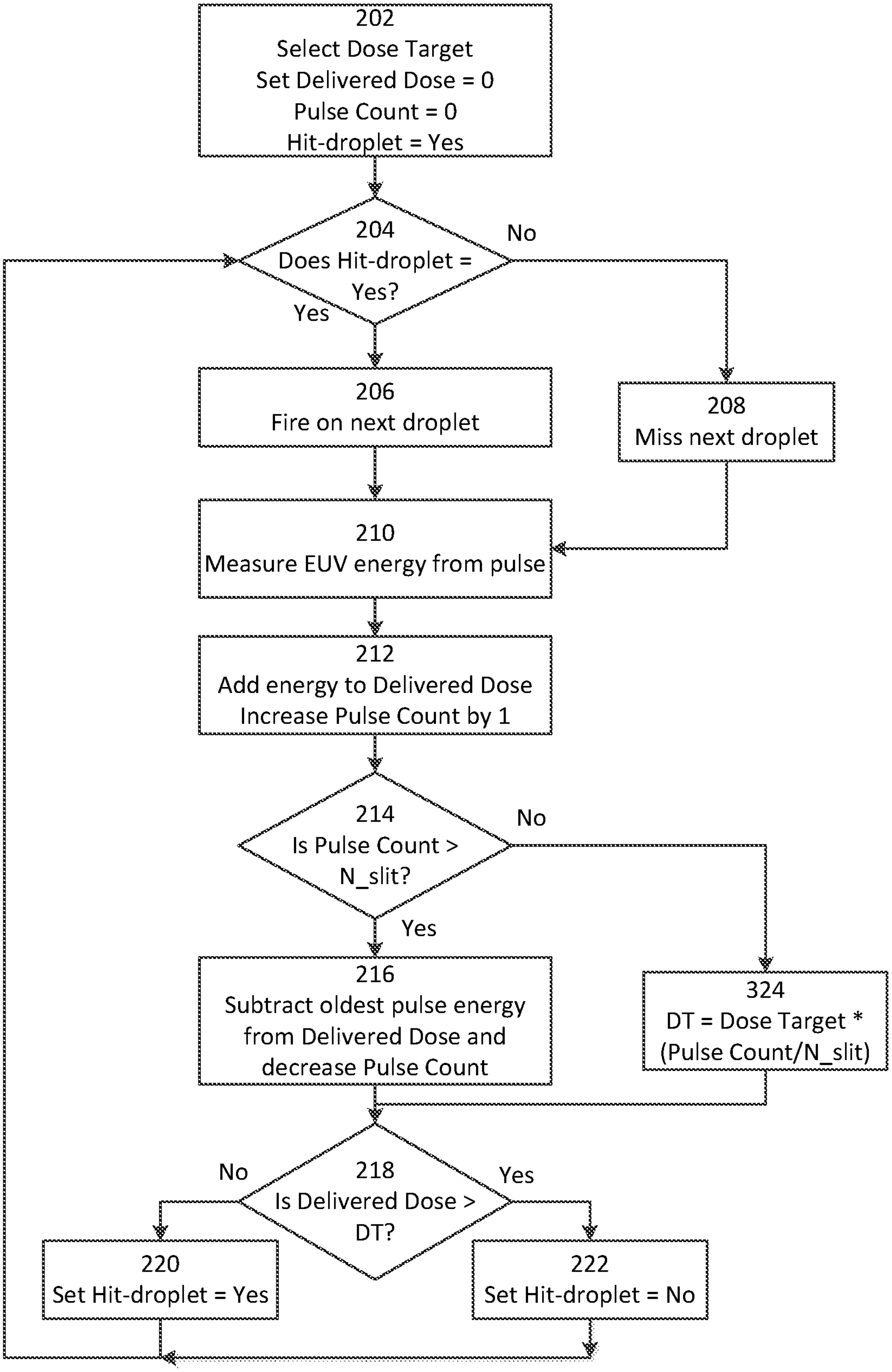
FIG. 3 is a flowchart of an alternative embodiment of a method for improving the control of a dose of EUV radiation generated by an LPP EUV light source.

An alternative embodiment of the method of FIG. 2 is shown in the flowchart of FIG. 3. This embodiment takes further account of initial operation of the LPP EUV source, i.e., the period from startup of the system before N_slit pulses have been fired.

The method shown in FIG. 3 is similar to that shown in FIG. 2. Now, however, while Dose Target is still set initially, during the period before N_slit pulses have been fired Dose Target is scaled, for example, by the controller, based upon the ratio between the number of pulses that have been fired and N_slit.

This is accomplished by adding step 324 to the method after step 214; if Pulse Count is not greater than N_slit, the controller sets a scaled Dose Target, here called DT, equal to Dose Target times the ratio Pulse Count divided by N_slit. Thus, for example, if pulses totaling 25% of N_slit have been fired, DT will be 25% of Dose Target, while if 40% of N_slit pulses have been fired DT will be 40% of Dose Target, etc.

This modification to the method results in Dose Target being evenly spread over the N_slit pulses, within the same limits of variability of pulse energy discussed above. Without the modification it is at least theoretically possible that a string of pulses could all result in relatively high EUV energy and exceed Dose Target well before N_slit pulses have been fired, although as above this is unlikely. This modification will, as described above, typically require only one, and rarely two, droplets to be missed, and thus prevents the necessity of at some point requiring a number of sequential droplets to be missed to reduce the delivered energy to Dose Target.

Figure 4:
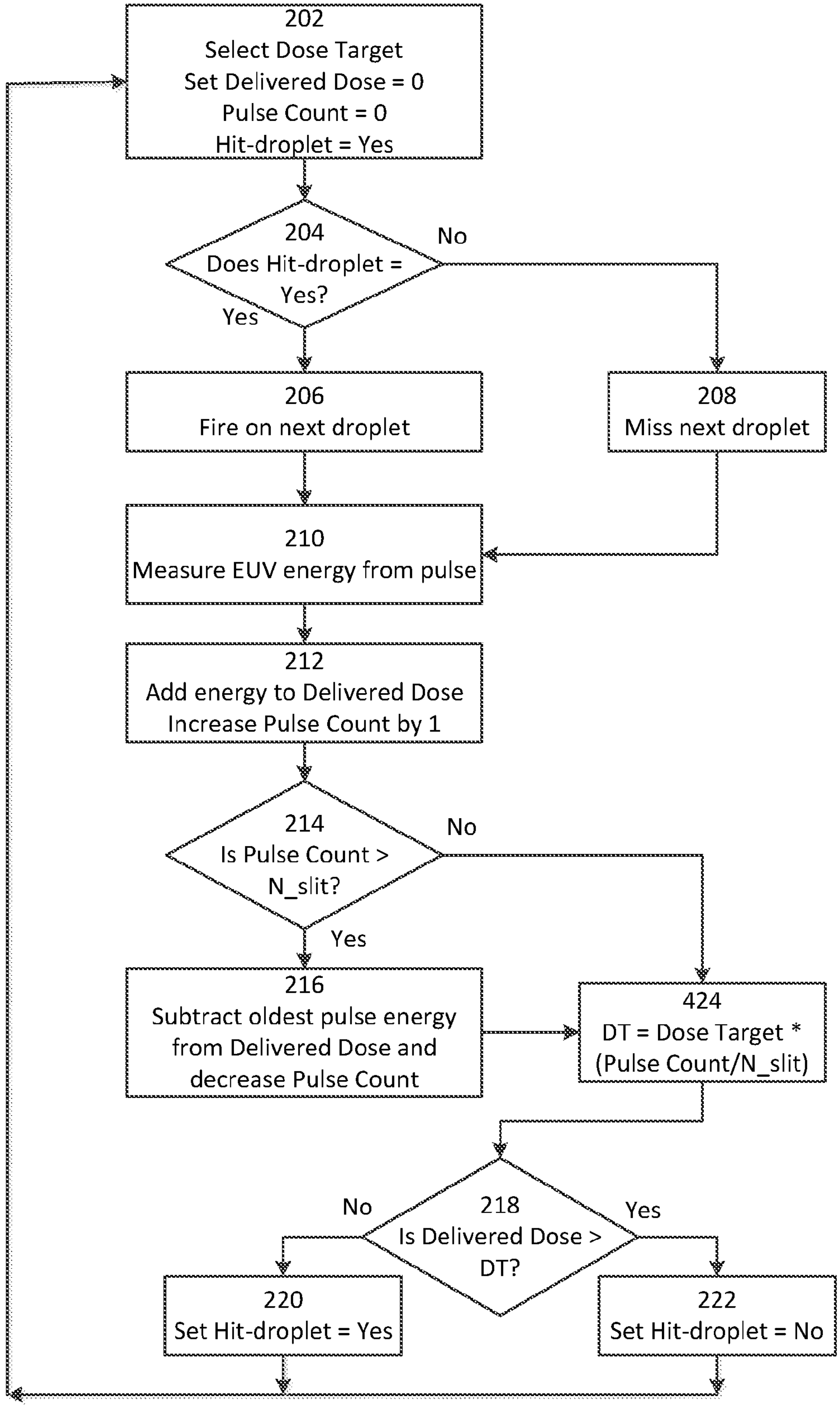
FIG. 4 is a flowchart of still another embodiment of a method for improving the control of a dose of EUV radiation generated by an LPP EUV light source.

Still another modification of the method, similar to that of FIG. 3, is shown in the flowchart of FIG. 4. As in the method of FIG. 3, at step 424 Dose Target is again scaled, for example, by the controller, to a value DT based upon the ratio of the number of pulses fired to N_slit. Now, however, this is done whether Pulse Count is greater than N_slit or not.

If the controller determines that Pulse Count is less than N_slit, this will result in Dose Target being scaled to DT based upon the number of pulses. If the Pulse Count equals N_slit, then DT will be the same as Dose Target.

It may be seen that the method of FIG. 4 allows for the initial operation of the system in a slightly different way than that of FIG. 3. Mathematically, the methods of FIGS. 3 and 4 are the same. One of skill in the art may find a preference between the two methods depending upon the specific system configuration and control logic, and the programming needed for such a system.

One of skill in the art will appreciate that the system illustrated in FIG. 1, described as being able to perform either packet-based dose control or EUV stabilization dose control, may also be used to perform the methods described herein. Sensor 112 still measures the amount of EUV energy from each pulse, and laser controller 111 may be programmed to perform the steps described above.

It will be apparent to one of skill in the art that the methods and apparatus described herein result in advantages over the prior art above. It is expected that only one droplet, or rarely two, will need be missed in order to keep the delivered dose close to the dose target, rather than the larger numbers of droplets that may need to be missed in packet-based dose control. In addition, unlike the EUV stabilization dose control of the prior art, in the described methods and apparatus the laser source, such as laser source 101, can always fire at full power, thus preventing self-lasing due to incomplete power extraction and reducing unwanted reflections that may damage optical components.

The disclosed method and apparatus have been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above.

Different algorithms and/or logic circuits than those disclosed herein may be used. Certain steps in the described methods may be performed in a different order, for example, step 214 can be executed after step 218, with appropriate changes to the comparison of Pulse Count to N_slit.

While certain examples have been provided of various configurations, components and parameters, one of skill in the art will also be able to determine other possibilities that may be appropriate for a particular LPP EUV system. Different types of source lasers, sensors, focus lenses and other optics, or other components, or different frequencies of droplets and pulses may be used.

It should also be appreciated that the described method and apparatus can be implemented in numerous ways, including as a process, an apparatus, or a system. The methods described herein may be implemented in part by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. In some embodiments the program instructions may be stored remotely and sent over a network via optical or electronic communication links. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method for controlling a dose of extreme ultraviolet (EUV) radiation generated by a laser produced plasma (LPP) EUV light source, the LPP EUV light source creating EUV energy by firing source laser pulses capable of hitting droplets of target material with a laser pulse, comprising:
- firing a pulse from the source laser to hit a droplet;
- measuring by a sensor the EUV energy created by the laser pulse hitting the droplet;
- adding, by a controller, the measured EUV energy to a running total of the EUV dose generated by laser pulses that have been fired;
- incrementing, by the controller, a count of laser pulses that have been fired;
- comparing, by the controller, the count of laser pulses to a predetermined number; and
- if the count of laser pulses exceeds the predetermined number:
  - subtracting, by the controller, the EUV energy measured from a pulse immediately preceding the most recent predetermined number of pulses from the running total of the EUV dose generated and decreasing the count of laser pulses by one;
  - comparing, by the controller, the running total of the EUV dose generated to a preselected dose target; and
  - if the running total of the EUV dose exceeds the dose target, causing, by the controller, the source laser to fire a next laser pulse to not hit a droplet.

2. The method of claim 1, further comprising:
- if the count of laser pulses does not exceed the predetermined number:
  - scaling a preselected dose target by the ratio of the count of laser pulses to the predetermined number to obtain a scaled dose target;
  - comparing, by the controller, the running total of the EUV dose generated to the scaled dose target; and
  - if the running total of the EUV dose exceeds the scaled dose target, causing, by the controller, the source laser to fire a next laser pulse to not hit a droplet.

3. The method of claim 1 wherein the predetermined number of laser pulses is the number of pulses that the laser source fires in the time it takes for an aperture between the laser source and an object receiving the EUV radiation to move the width of the aperture relative to the object.

4. A system for controlling a dose of extreme ultraviolet (EUV) radiation generated by a laser produced plasma (LPP) extreme EUV light source, the LPP EUV light source creating EUV energy by firing source laser pulses capable of hitting droplets of target material with a laser pulse, comprising:
- a sensor configured to measure the EUV energy created by a laser pulse hitting a droplet;
- a controller configured to:
  - cause the source laser to fire a pulse to hit a droplet;
  - add the measured EUV energy to a running total of the EUV dose generated by laser pulses that have been fired;
  - increment a count of laser pulses that have been fired;
  - compare the count of laser pulses to a predetermined number; and
  - if the count of laser pulses exceeds the predetermined number:
    - subtract the EUV energy measured from a pulse immediately preceding the most recent predetermined number of pulses from the running total of the EUV dose generated and decrease the count of laser pulses by one;
    - compare the running total of the EUV dose generated to a preselected dose target; and
    - if the running total of the EUV dose exceeds the dose target, cause the source laser to fire a next laser pulse to not hit a droplet.

5. The system of claim 4, wherein the controller is further configured to:
- if the count of laser pulses does not exceed the predetermined number:
  - scale a preselected dose target by the ratio of the count of laser pulses to the predetermined number to obtain a scaled dose target;
  - compare the running total of the EUV dose generated to the scaled dose target; and
  - if the running total of the EUV dose exceeds the scaled dose target, cause the source laser to fire a next laser pulse to not hit a droplet.

6. The system of claim 4 wherein the predetermined number of laser pulses is the number of pulses that the laser source fires in the time it takes for an aperture between the laser source and an object receiving the EUV radiation to move the width of the aperture relative to the object.

7. A non-transitory computer readable storage medium having embodied thereon instructions for causing a computing device to execute a method for controlling a dose of extreme ultraviolet (EUV) radiation generated by a laser produced plasma (LPP) EUV light source, the LPP EUV light source creating EUV energy by firing source laser pulses capable of hitting droplets of target material with a laser pulse, the method comprising:
- firing a pulse from the source laser to hit a droplet;
- measuring by a sensor the EUV energy created by the laser pulse hitting the droplet;
- adding, by a controller, the measured EUV energy to a running total of the EUV dose generated by laser pulses that have been fired;
- incrementing, by the controller, a count of laser pulses that have been fired;
- comparing, by the controller, the count of laser pulses to a predetermined number; and
- if the count of laser pulses exceeds the predetermined number:
  - subtracting, by the controller, the EUV energy measured from a pulse immediately preceding the most recent predetermined number of pulses from the running total of the EUV dose generated and decreasing the count of laser pulses by one;

comparing, by the controller, the running total of the EUV dose generated to a preselected dose target; and if the running total of the EUV dose exceeds the dose target, causing, by the controller, the source laser to fire a next laser pulse to not hit a droplet.

8. The non-transitory computer readable storage medium of claim 7 having embodied thereon instructions for causing a computing device to execute a method, the method further comprising:

if the count of laser pulses does not exceed the predetermined number:

scaling a preselected dose target by the ratio of the count of laser pulses to the predetermined number to obtain a scaled dose target;

comparing, by the controller, the running total of the EUV dose generated to the scaled dose target; and if the running total of the EUV dose exceeds the scaled dose target, causing, by the controller, the source laser to fire a next laser pulse to not hit a droplet.

9. The non-transitory computer readable storage medium of claim 7 having embodied thereon instructions for causing a computing device to execute a method, wherein the predetermined number of laser pulses is the number of pulses that the laser source fires in the time it takes for an aperture between the laser source and an object receiving the EUV radiation to move the width of the aperture relative to the object.

* * * * *